United States Patent
Vera et al.

(10) Patent No.: US 10,896,326 B2
(45) Date of Patent: Jan. 19, 2021

(54) TRIANGULATION METHOD FOR DETERMINING TARGET POSITION

(71) Applicant: RAYTHEON COMPANY, Waltham, MA (US)

(72) Inventors: Richard C. Vera, Allen, TX (US); Andrew James Neville, McKinney, TX (US)

(73) Assignee: Raytheon Company, Waltham, MA (US)

( * ) Notice: Subject to any disclaimer, the term of this patent is extended or adjusted under 35 U.S.C. 154(b) by 303 days.

(21) Appl. No.: 15/987,791

(22) Filed: May 23, 2018

(65) Prior Publication Data

US 2019/0362125 A1    Nov. 28, 2019

(51) Int. Cl.
*G06K 9/00*    (2006.01)
*G06T 7/73*    (2017.01)

(52) U.S. Cl.
CPC .............. *G06K 9/0063* (2013.01); *G06T 7/75* (2017.01); *G06K 2209/21* (2013.01); *G06T 2207/10044* (2013.01)

(58) Field of Classification Search
CPC .... G06K 9/0063; G06K 2209/21; G06T 7/75; G06T 2207/10044; G01S 5/04; G01C 21/005
See application file for complete search history.

(56) References Cited

U.S. PATENT DOCUMENTS

| 4,672,564 | A  | * | 6/1987  | Egli ....................... G01S 5/163 348/140 |
| 6,744,397 | B1 |   | 6/2004  | Hager et al. |
| 7,187,327 | B2 | * | 3/2007  | Coluzzi ................. G01S 5/0221 342/387 |
| 8,224,505 | B2 |   | 7/2012  | Botargues et al. |
| 9,706,356 | B2 |   | 7/2017  | Lin et al. |
| 2010/0305858 | A1 | * | 12/2010 | Richardson ........ G06K 9/00785 701/301 |

(Continued)

OTHER PUBLICATIONS

International Search Report for corresponding International Application No. PCT/US2019/020092, filed Feb. 28, 2019, International Search Report dated May 22, 2019 and mailed Jun. 25, 2019 (4 pgs.).

(Continued)

*Primary Examiner* — Yon J Couso
(74) *Attorney, Agent, or Firm* — Lewis Roca Rothgerber Christie LLP

(57) ABSTRACT

A system and method for determining a position of a target. The method includes determining a first direction to the target from a first observing position, estimating a first approximate position of the target based on the first direction and the first observing position, determining a second direction to the target from a second observing position, and estimating a second approximate position of the target based on the second direction and the second observing position. The method further includes determining a first approximate intersection point of (i) a first finite length line between the first observing position and the first approximate position of the target, and (ii) a second finite length line between the second observing position and the second approximate position of the target.

20 Claims, 3 Drawing Sheets

(56) References Cited

U.S. PATENT DOCUMENTS

| | | | |
|---|---|---|---|
| 2011/0231094 A1* | 9/2011 | Simon | G01S 5/16 701/469 |
| 2011/0309983 A1 | 12/2011 | Holzer et al. | |
| 2014/0104112 A1* | 4/2014 | May | G01S 5/12 342/450 |
| 2015/0233712 A1 | 8/2015 | Knapp | |

OTHER PUBLICATIONS

Written Opinion of the International Searching Authority for corresponding International Application No. PCT/US2019/020092, filed Feb. 28, 2019, Written Opinion of the International Searching Authority dated Jun. 25, 2019 (6 pgs.).

* cited by examiner

TRIANGULATION METHOD FOR DETERMINING TARGET POSITION

GOVERNMENT LICENSE RIGHTS

This invention was made with Government support. The Government has certain rights in the invention.

FIELD

One or more aspects of embodiments according to the present invention relate to target estimation, and more particularly to a system and method for detecting a target position when detailed, accurate terrain elevation data is not available.

BACKGROUND

In various commercial and military applications it is advantageous to estimate the position of a target in three dimensions. For example, aerial surveys to identify candidate positions for wireless towers, or to find the position of a landing zone, e.g., for an unmanned aerial delivery vehicle, may use such position estimation to estimate the coordinates of the target being surveyed. Location estimation techniques that rely, for the formation of the position estimate, on an accurate terrain elevation model may produce poor quality estimates, especially when the estimated terrain elevation does not accurately reflect the elevation of the target. Such inaccuracy may occur, for example, if the target is on the roof of a building that is not part of the elevation model used. Similar challenges may be present for surface vehicles (e.g., autonomous road vehicles) estimating a position of a target (e.g., on a tower, or other building) visible from the surface.

Thus, there is a need for an improved system and method for detecting a target position.

SUMMARY

According to an embodiment of the present invention there is provided a method for determining a position of a target, the method including: determining a first direction to the target from a first observing position; estimating a first approximate position of the target based on the first direction and the first observing position; determining a second direction to the target from a second observing position; estimating a second approximate position of the target based on the second direction and the second observing position; and determining a first approximate intersection point of: a first finite length line between the first observing position and the first approximate position of the target, and a second finite length line between the second observing position and the second approximate position of the target.

In one embodiment, the method includes: determining a third direction to the target from a third observing position, estimating a third approximate position of the target based on the third direction and the third observing position, and determining a second approximate intersection point between: the second finite length line, and a third finite length line between the third observing position and the third approximate position of the target.

In one embodiment, the method includes forming a straight average of a plurality of approximate intersection points including the first approximate intersection point and the second approximate intersection point.

In one embodiment, the method includes forming a weighted average of: the straight average; and the second approximate intersection point.

In one embodiment, the determining of the first approximate intersection point of the first finite length line and the second finite length line includes: when the first finite length line and the second finite length line have a point of intersection, finding the point of intersection of the first finite length line and the second finite length line, and when the first finite length line and the second finite length line do not intersect, finding a point separated from a midpoint of a shortest line connecting the first finite length line and the second finite length line by less than twice the length of the shortest line connecting the first finite length line and the second finite length line.

In one embodiment, the determining of the first approximate intersection point of the first finite length line and the second finite length line includes: representing the first finite length line as: a three-element point A, and a three-element point B, each being a respective endpoint of the first finite length line, representing the second finite length line as: a three-element point C, and a three-element point D, each being a respective endpoint of the second finite length line, defining a first infinite length line collinear with the first finite length line and parameterized by a parameter t, the parameter t being proportional to a distance along the first infinite length line from the point A, defining a second infinite length line collinear with the second finite length line and parameterized by a parameter s, the parameter s being a proportional to distance along the second infinite length line from the point C, solving an overdetermined linear system for values of s and t, the overdetermined linear system resulting from equating: coordinates, parameterized by the parameter t, of points in the first infinite line, to coordinates, parameterized by the parameter s, of points in the second infinite line, and substituting the value of one of the parameters s and t into the equation for the respective corresponding infinite length line.

In one embodiment, the solving of the overdetermined linear system includes solving the overdetermined linear system using a QR factorization.

In one embodiment, the estimating of the first approximate position of the target includes: estimating the first approximate position of the target as an intersection of: an infinite length line from the first observing position, in the first direction, with a terrain model surface.

In one embodiment, the terrain model surface is defined as a local terrain elevation offset from an Earth ellipsoid.

In one embodiment, the local terrain elevation offset is represented as a grid of elevation points, each elevation point being an estimated elevation, above the Earth ellipsoid, at a respective grid point, each grid point being defined by a latitude and a longitude.

According to an embodiment of the present invention there is provided a system for determining a position of a target, the system including a sensor connected to a processing circuit, the processing circuit being configured to: determine a first direction to the target from a first observing position; estimate a first approximate position of the target based on the first direction and the first observing position; determine a second direction to the target from a second observing position; estimate a second approximate position of the target based on the second direction and the second observing position; and determine a first approximate intersection point of: a first finite length line between the first observing position and the first approximate position of the target, and a second finite length line between the second observing position and the second approximate position of the target.

In one embodiment, the processing circuit is further configured to: determine a third direction to the target from a third observing position, estimate a third approximate position of the target based on the third direction and the third observing position, and determine a second approximate intersection point between: the second finite length line, and a third finite length line between the third observing position and the third approximate position of the target.

In one embodiment, the processing circuit is further configured to form a straight average of a plurality of approximate intersection points including the first approximate intersection point and the second approximate intersection point.

In one embodiment, the processing circuit is further configured to form a weighted average of: the straight average; and the second approximate intersection point.

In one embodiment, the determining of the first approximate intersection point of the first finite length line and the second finite length line includes: when the first finite length line and the second finite length line have a point of intersection, finding the point of intersection of the first finite length line and the second finite length line, and when the first finite length line and the second finite length line do not intersect, finding a point separated from a midpoint of a shortest line connecting the first finite length line and the second finite length line by less than twice the length of the shortest line connecting the first finite length line and the second finite length line.

In one embodiment, the determining of the first approximate intersection point of the first finite length line and the second finite length line includes: representing the first finite length line as: a three-element point A, and a three-element point B, each being a respective endpoint of the first finite length line, representing the second finite length line as: a three-element point C, and a three-element point D, each being a respective endpoint of the second finite length line, defining a first infinite length line collinear with the first finite length line and parameterized by a parameter t, the parameter t being proportional to a distance along the first infinite length line from the point A, defining a second infinite length line collinear with the second finite length line and parameterized by a parameter s, the parameter s being a proportional to distance along the second infinite length line from the point C, solving an overdetermined linear system for values of s and t, the overdetermined linear system resulting from equating: coordinates, parameterized by the parameter t, of points in the first infinite line, to coordinates, parameterized by the parameter s, of points in the second infinite line, and substituting the value of one of the parameters s and t into the equation for the respective corresponding infinite length line.

In one embodiment, the solving of the overdetermined linear system includes solving the overdetermined linear system using a QR factorization.

In one embodiment, the estimating of the first approximate position of the target includes: estimating the first approximate position of the target as an intersection of: an infinite length line from the first observing position, in the first direction, with a terrain model surface.

In one embodiment, the terrain model surface is defined as a local terrain elevation offset from an Earth ellipsoid.

In one embodiment, the local terrain elevation offset is represented as a grid of elevation points, each elevation point being an estimated elevation, above the Earth ellipsoid, at a respective grid point, each grid point being defined by a latitude and a longitude.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a triangulation method for determining target positions provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
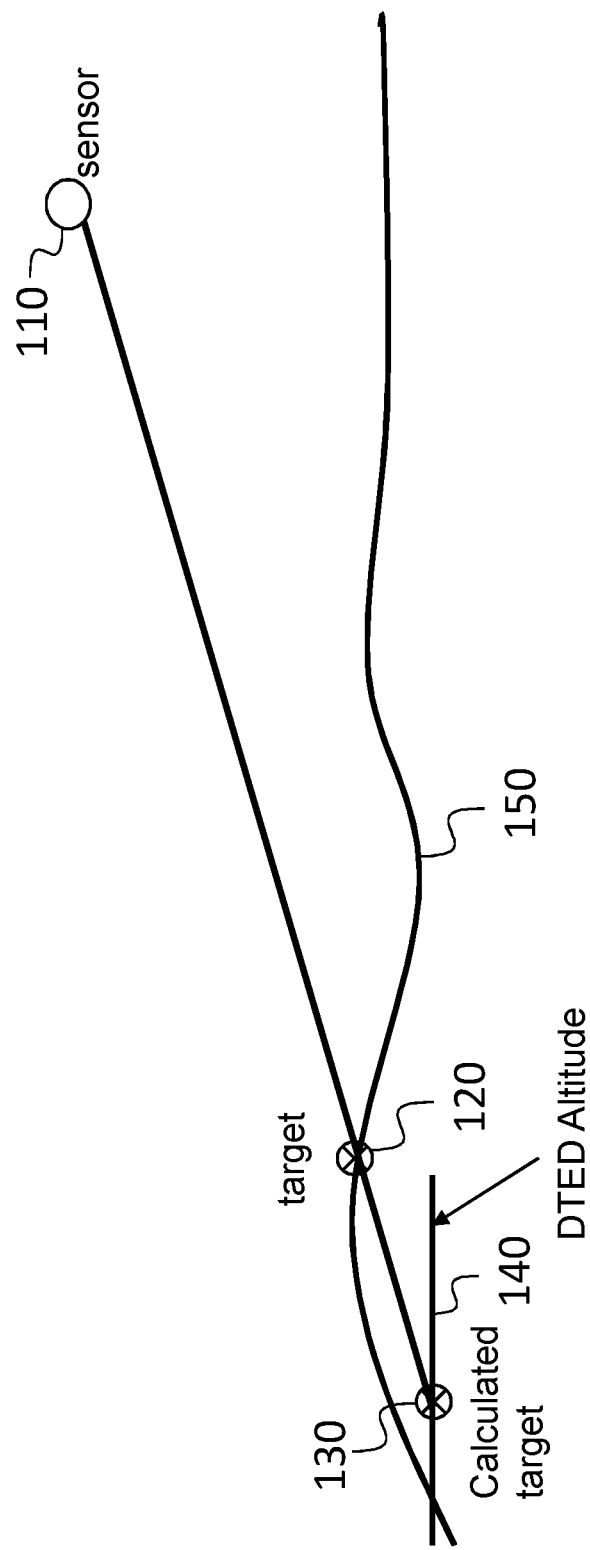
FIG. 1 is an illustration of a first target observation, according to an embodiment of the present invention.

Referring to FIG. 1, in some embodiments, a sensor 110, e.g., an optical or radar sensor on a moving platform (e.g., on an aircraft), tracks a target 120 on the ground, or, e.g., on the roof of a building. From position and attitude estimates for the platform, and from measurements of the pointing of the sensor 110 relative to the platform, a direction to the target 120 is calculated. A first approximate target position 130 may then be estimated, as the point of intersection between (i) a line passing through the sensor 110, in the measured direction to the target 120, and (ii) a terrain model surface 140. The terrain model surface 140 may be, for example, an ellipsoid, or "Earth ellipsoid" approximating the surface of the entire Earth, corrected locally by a grid of elevation points (e.g. a set of digital terrain elevation data (DTED)), each of the elevation points being an estimated elevation, above the Earth ellipsoid, at a respective grid point, each grid point being defined by a latitude and a longitude. If the true ground level 150 differs significantly from the terrain model surface 140 near the target 120, then the first approximate target position 130 may differ significantly from the true position of the target 120, as is apparent in the example of FIG. 1.

Figure 2:
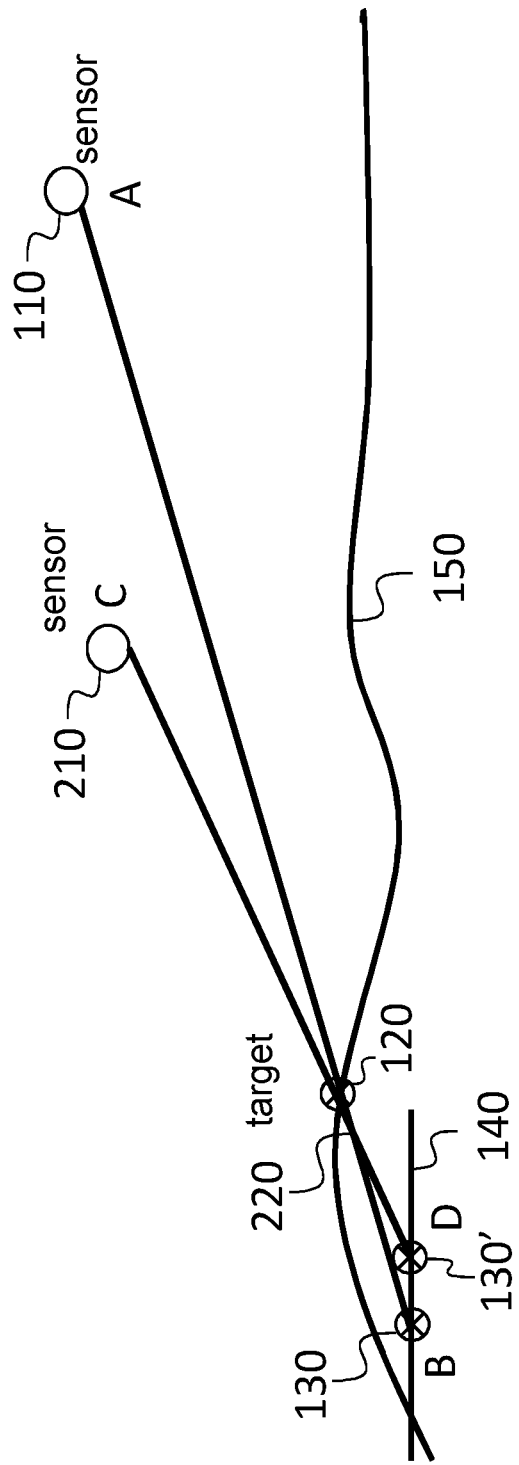
FIG. 2 is an illustration of a plurality of target observations, according to an embodiment of the present invention.

Referring to FIG. 2, after the platform has moved by some distance to a new or second platform position 210, the process may be repeated, producing a second approximate target position 130' that also may differ significantly from the true position of the target 120. However, a point referred to as a first approximate intersection point 220 may be near the true position of the target 120, as shown. The first approximate intersection point 220 may be the approximate intersection point of (i) a first finite length line joining (1) the first position of the platform (or "first observing position") and (2) the first approximate target position 130, and (ii) a second finite length line joining (1) the second position of the platform 210 (or "second observing position") and (2) the second approximate target position 130'. These lines may be referred to as the lines "A-B" and "C-D" respectively, based on the labels of their respective endpoints in FIG. 2. The first and second finite length lines may not be within a single plane, and therefore may not intersect. If they do not intersect, it may nonetheless be possible to define a point at which they nearly intersect. For two infinite length lines (a first line and a second line), such a point may be defined to be, e.g., a midpoint of a shortest line connecting the first line and the second line (i.e., a midpoint of the shortest straight line that can be drawn from the first line to the second line) or a point near such a midpoint (e.g., separated from the midpoint by at most twice the length of the shortest line connecting the first line and the second line). Such a point, that is either at the intersection of two lines, or separated from the midpoint by at most twice the length of the shortest line connecting the first line and the second line is referred to herein as an "approximate intersection point" of the two lines. An approximate intersection point of two finite length lines is defined herein to be any approximate intersection point of two infinite length lines respectively collinear with the two finite length lines.

Figure 3:
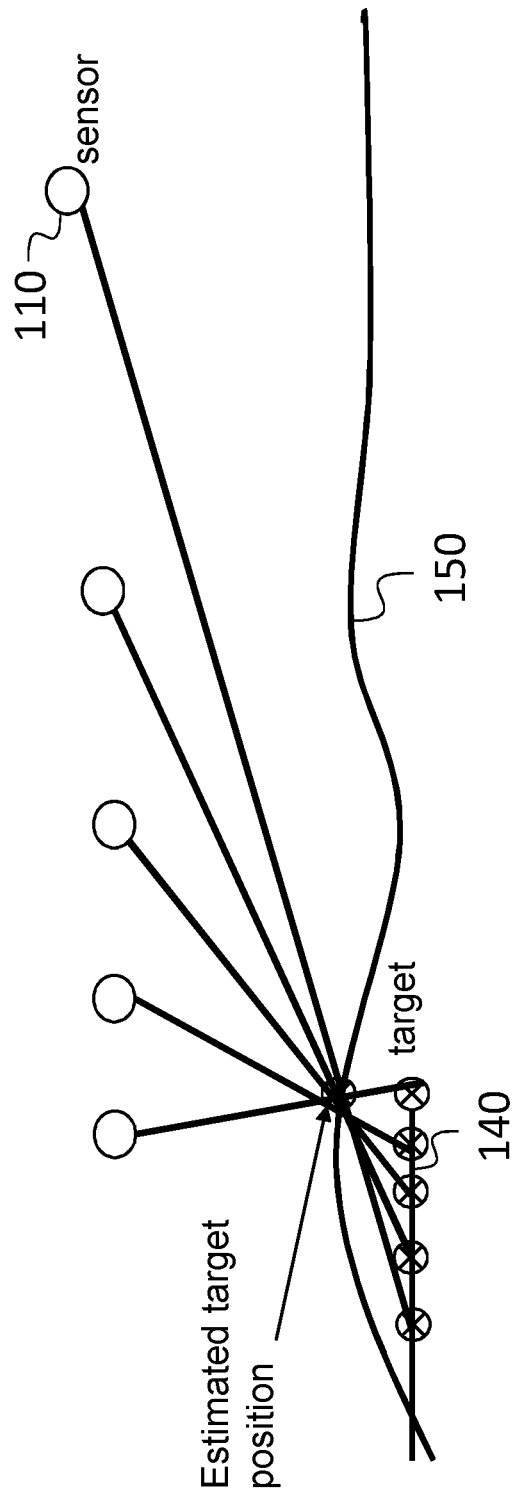
FIG. 3 is an illustration of a plurality of target observations, according to an embodiment of the present invention.

As shown in FIG. 3, the process may be repeated as the platform continues to move, each observation of the target 120 being combined with the previous observation of the target 120 to generate an additional approximate intersection point. The approximate intersection points that result may be averaged together, or combined with a filter referred to as an alpha beta filter (discussed in further detail below) to form a final, improved estimate of the position of the target. In some embodiments, the lines combined pairwise to form a sequence of approximate intersection point are not from consecutive observing positions, but are instead from relatively widely separated observing positions. For example, raw data may first be collected from ten observing positions, and then a first approximate intersection point may be determined between the line obtained from the first observation and the line obtained from the eleventh observation, a second approximate intersection point may be determined between the line obtained from the second observation and the line obtained from the twelfth observation, and so on. In some embodiments the calculated approximate intersection points are relatively insensitive to errors in the terrain model surface 140, and, accordingly, a low-fidelity terrain model surface 140 (e.g., a horizontal plane below the platform by a distance equal to the platform's height above ground level (AGL)) may be used.

Details of how each approximate intersection point of a sequence of approximate intersection points may be calculated, and how the points of the sequence may be averaged and filtered, are discussed below and illustrated in the code listings of the Appendix. The code listings of the Appendix contain listings for seven Matlab files, each having a filename ending in ".m". Reference to the code listings is made using the format (filename, <line number>) (to refer to a single line in the file identified by the filename) or (filename, <first line number>-<second line number>) (to refer to a range of lines, from the first line number to the second line number, inclusive, in the file identified by the filename). The file runTriangTest.m is a top level test function that defines parameters for a simulation, simulates various sensor positions, and simulates the calculation and filtering of a sequence of approximate intersection points. The function findIntersection, which is called from runTriangTest.m (at (runTriangTest, 103)), finds the approximate intersection point of two finite length lines, each defined by two endpoints. The Cartesian coordinates of the four points (two endpoints for each of the two finite length lines) are used as input to the function findIntersection. The four points are a point A, the position of the sensor (e.g., the position of an aircraft carrying the sensor) at a first observing position, a point B, the first approximate position of the target, a point C, the position of the sensor at a second observing position, and a point D, the second approximate position of the target. The points A, B, C, and D are shown in FIG. 2 for the example illustrated there. Each of these points may be defined by three coordinates (e.g., three Cartesian coordinates), or "elements", and written in the form of three-element vectors, as follows:

$$A = [a_1, a_2, a_3]^T$$

$$B = [b_1, b_2, b_3]^T \tag{1}$$

$$C = [c_1, c_2, c_3]^T$$

$$D = [d_1, d_2, d_3]^T \tag{3}$$

As used here, symbols in italics in the equations have the same meaning as non-italic symbols elsewhere in the present disclosure and claims. In the Appendix these four points are generated in runTriangTest.m (at (runTriangTest, 98-101)). Each pair of points (A, B) and (C, D) defines a finite length line having the pair of points as respective endpoints (i.e., from a respective observing position to a respective approximate position of the target). Equation (3) below defines a first infinite length line collinear with the first finite length line (which connects A to B) and parameterized by a parameter t. Similarly, Equation (4) below defines a second infinite length line collinear with the second finite length line (which connects C to D) and parameterized by a parameter s. These two equations, Equation (3) and Equation (4), are thus functions each of which may be used to compute a point on the respective line between the respective pair of points in three dimensional space:

$$\begin{bmatrix} x \\ y \\ z \end{bmatrix} = A + t(B - A) = \begin{bmatrix} a_1 \\ a_2 \\ a_3 \end{bmatrix} + t \begin{bmatrix} b_1 - a_1 \\ b_2 - a_2 \\ b_3 - a_3 \end{bmatrix} \tag{3}$$

$$\begin{bmatrix} x \\ y \\ z \end{bmatrix} = C + s(D - C) = \begin{bmatrix} c_1 \\ c_2 \\ c_3 \end{bmatrix} + s \begin{bmatrix} d_1 - c_1 \\ d_2 - c_2 \\ d_3 - c_3 \end{bmatrix} \tag{4}$$

In Equation (3) the parameter t is proportional to a distance, along the first infinite length line, from the point A, and in Equation (4) the parameter t is proportional to a distance, along the second infinite length line, from the point C.

Motivated by the observation that in the absence of errors the two lines would be expected to intersect at some point in three dimensional space, the two equations are set equal to each other and the system of equations shown in Equation (5) is produced.

$$\begin{bmatrix} b_1 - a_1 & c_1 - d_1 \\ b_2 - a_2 & c_2 - d_2 \\ b_3 - a_3 & c_3 - d_3 \end{bmatrix} \begin{bmatrix} t \\ s \end{bmatrix} = \begin{bmatrix} c_1 - a_1 \\ c_2 - a_2 \\ c_3 - a_3 \end{bmatrix} \tag{5}$$

This may be written, by a change of variables (see (findIntersection, 15-17) and (findIntersection, 19-20)), as follows:

$$\begin{bmatrix} \alpha_{1,1} & \alpha_{1,2} \\ \alpha_{2,1} & \alpha_{2,2} \\ \alpha_{3,1} & \alpha_{3,2} \end{bmatrix} \begin{bmatrix} t \\ s \end{bmatrix} = \begin{bmatrix} \beta_1 \\ \beta_2 \\ \beta_3 \end{bmatrix} \tag{6}$$

A QR factorization method may be employed to solve the overdetermined linear system of Equation (6). This method may either find (i) an exact intersection, if the two lines intersect, or (ii) a least squares solution (which may be an approximate intersection point of the two lines) if the two lines do not intersect. In the QR factorization method, the product of the Q and R matrices are equal to the coefficient matrix which is shown in Equation (7). The right hand side of Equation (8) shows the elements of the Q and R matrices.

$$\begin{bmatrix} \alpha_{1,1} & \alpha_{1,2} \\ \alpha_{2,1} & \alpha_{2,2} \\ \alpha_{3,1} & \alpha_{3,2} \end{bmatrix} = QR \quad (7)$$

$$\begin{bmatrix} \alpha_{1,1} & \alpha_{1,2} \\ \alpha_{2,1} & \alpha_{2,2} \\ \alpha_{3,1} & \alpha_{3,2} \end{bmatrix} = [e_1 | e_2] \begin{bmatrix} v_1 \cdot e_1 & v_2 \cdot e_1 \\ 0 & v_2 \cdot e_2 \end{bmatrix} \quad (8)$$

In equation 8, the bar "|" notation represents concatenation (of two three-element column vectors, to form a 3×2 matrix).

Equations (9)-(13) below are used to calculate the values within the Q and R matrices and these equations a derived from a Gram-Schmidt process:

$$u_1 = v_1 = [\alpha_{1,1}, \alpha_{2,1}, \alpha_{3,1}]^T \quad (9)$$

$$v_2 = [\alpha_{1,2}, \alpha_{2,2}, \alpha_{3,2}]^T \quad (10)$$

$$e_1 = u_1/\|u_1\| \quad (11)$$

$$u_2 = v_2 - (v_2 \cdot e_1)e_1 \quad (12)$$

$$e_2 = u_2/\|u_2\| \quad (13)$$

(see (findIntersection, 30-35)).

Equations (14.1)-(15.2) below may then be used to solve for s:

$$[e_1 | e_2] \begin{bmatrix} v_1 \cdot e_1 & v_2 \cdot e_1 \\ 0 & v_2 \cdot e_2 \end{bmatrix} \begin{bmatrix} t \\ s \end{bmatrix} = \begin{bmatrix} \beta_1 \\ \beta_2 \\ \beta_3 \end{bmatrix} \quad (14.1)$$

$$\begin{bmatrix} v_1 \cdot e_1 & v_2 \cdot e_1 \\ 0 & v_2 \cdot e_2 \end{bmatrix} \begin{bmatrix} t \\ s \end{bmatrix} = [e_1 | e_2]^T \begin{bmatrix} \beta_1 \\ \beta_2 \\ \beta_3 \end{bmatrix} \quad (14.2)$$

$$\begin{bmatrix} (v_1 \cdot e_1)t + (v_2 \cdot e_1)s \\ (v_2 \cdot e_2)s \end{bmatrix} = [e_1 | e_2]^T \begin{bmatrix} \beta_1 \\ \beta_2 \\ \beta_3 \end{bmatrix} \quad (14.3)$$

$$(v_2 \cdot e_2)s = e_2^T \begin{bmatrix} \beta_1 \\ \beta_2 \\ \beta_3 \end{bmatrix} \quad (14.4)$$

$$(v_2 \cdot e_2)s = e_{2(1)}\beta_1 + e_{2(2)}\beta_2 + e_{2(3)}\beta_3 \quad (15.1)$$

$$s = \frac{e_{2(1)}\beta_1 + e_{2(2)}\beta_2 + e_{2(3)}\beta_3}{(v_2 \cdot e_2)} \quad (15.2)$$

(with s (of, e.g., Equation (15.2)) corresponding to the variable x_2 in findIntersection.m, Equation (14.3) being at (findIntersection, 48) and Equation (15.2) being at (findIntersection, 51)).

In other embodiments, the overdetermined linear system of Equation (6) is instead solved using a linear least squares approach, e.g., calculating a least-squares solution q, where $$q = (X^T X)X^T y, \text{ where } q = \begin{bmatrix} t \\ s \end{bmatrix}, X = \begin{bmatrix} \alpha_{1,1} & \alpha_{1,2} \\ \alpha_{2,1} & \alpha_{2,2} \\ \alpha_{3,1} & \alpha_{3,2} \end{bmatrix}, \text{ and } y = \begin{bmatrix} \beta_1 \\ \beta_2 \\ \beta_3 \end{bmatrix}.$$

After s is found, the value of s is substituted back into Equation (4) (at (findIntersection, 57)), to determine the approximate intersection point. In other embodiments, t is instead calculated and substituted into Equation (3), or both s and t are calculated and substituted into Equation (4) and Equation (3) respectively, and the two resulting points are averaged, i.e., the midpoint between the two resulting points is used as the approximate intersection point.

This process may be repeated for any pair of observing positions, e.g., repeatedly calculating approximate positions of the target from a current observing position and a preceding observing position (e.g., the immediately preceding observing position, or an observing position in the more distant past), to generate a sequence of approximate positions of the target. These may be averaged together (i.e., using a "straight" average, a uniformly weighted average with a weight equal to the reciprocal of the number of values averaged), or filtered, to form a more accurate, single estimated position of the target. In one embodiment an alpha beta filter is used (at (runTriangTest, 125-127)), the output of which is the weighted sum of (i) the average of all of the approximate positions of the target and (ii) the most recently estimated approximate position of the target.

In some embodiments, the system and method disclosed herein may make possible improved estimation of the position of a target, especially when the available terrain model is imperfect, and thus some embodiments improve the technology of target position estimation. The estimated target position may then be used, for example, to site a wireless communications antenna tower at the target position, or to guide an unmanned aerial vehicle to the target position. In military applications the estimated target position may be used, for example, to launch a projectile or weapon at the target.

In some embodiments, the calculations described herein are performed by a processing circuit (e.g., a processing circuit on the platform). The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Although limited embodiments of a triangulation method for determining target positions have been specifically described and illustrated herein, many modifications and variations will be apparent to those skilled in the art. Accordingly, it is to be understood that a triangulation method for determining target positions employed according to principles of this invention may be embodied other than as specifically described herein. The invention is also defined in the following claims, and equivalents thereof.

APPENDICES: CODE LISTINGS runTriangTest.m

```
1    %% runTriangTest – top level test function
2
3
4
5
6
7
8
9
10
11   function [savAC_Lat, savLOS_Lat, savAC_Lon, savLOS_Lon, savAC_Alt,
         savLOS_Alt] = runTriangTest(frms,gr,yerr,dted_bias, distance_diff)
12     %% Turn Data into Unit Test values by setting value to 1
13     unitTest = 0;
14     LOS_Vector = zeros(3,1);
15     nav0 = zeros(3,1);
16     nav0(1) = 1.0;
17
18     %% set ac and gymbal data
19     trueTgtLat = deg2rad(32.125);
20     trueTgtLng = deg2rad(-95.725);
21     trueTgtAlt = 1500*.3048;  % Feet converted to Meters
22     dted_alt = 1000*.3048; % Feet converted to Meters
23     heading = 0;
24     pitch = 0;
25     roll = deg2rad(0);
26     gimb_az = deg2rad(90);
27     gimb_el = deg2rad(-15);
28     gimbal_error = .0004;
29     ellip = [6378137.0, sqrt(.00669437999013)];
30     frm_count = 1;
31     tri_count = 1;
32     alpha = .45;
33     beta  = 1.00 - alpha;
34     prevLat = 0;
35     prevLon = 0;
36     prevAlt = 0;
37     prevACx = 0;
38     prevACy = 0;
39     prevACz = 0;
40
```

```
41    %% ALGORITHM AND SIMULATION
42    for i = 0:frms
43
44        pitch = randn*gimbal_error;
45        roll = deg2rad(0) + randn*gimbal_error;
46        dted_alt = 1000*.3048 + dted_bias; % Feet converted to Meters
47        A = (i/45000)*360;
48
49        N = gr*.3048*sind(A);
50        E = gr*.3048*cosd(A);
51        D = -9000*.3048;
52
53        heading = atan2(N,E) + randn*gimbal_error;
54
55        [AC_Latitude, AC_Longitude, AC_Altitude] = ned2lla(N, E, D, trueTgtLat, trueTgtLng, trueTgtAlt);
56
57        [rae] = lla2rae(AC_Latitude, AC_Longitude, AC_Altitude,trueTgtLat, trueTgtLng, trueTgtAlt);
58
59        gimb_az = deg2rad(rae(2)) - heading + randn*gimbal_error;
60        gimb_el = deg2rad(rae(3)) + randn*gimbal_error;
61
62        %% get the rotation matrix for ac to NED and gimbals to AC
63        heading = heading+deg2rad(yerr);
64        ac_nav  = rotMatrix(heading,pitch,roll);
65        los_ac = rotMatrix(gimb_az,gimb_el,0.0);
66
67        nav = ac_nav*(los_ac*nav0);
68        %AC_Altitude = AC_Altitude + 304.8;
69        [tlat, tlng, talt, range ] = calcGeodFromLocal(AC_Latitude, AC_Longitude, AC_Altitude,nav,dted_alt,1);
70
71        LOS_Vector(1) = 1.0;
72        LOS_Vector(2) = 0.0;
73        LOS_Vector(3) = 0.0;
74        LOS_Vector = ac_nav*(los_ac*LOS_Vector);
75
76        %% Compute the value of the el gimbal.
77        Divisor = sqrt((LOS_Vector(1) * LOS_Vector(1)) + (LOS_Vector(2) * LOS_Vector(2)));
78
79        [ ACx,   ACy,   ACz] = geodetic2ecef(AC_Latitude, AC_Longitude, AC_Altitude, ellip);
80
81        % find distance between current AC location and prior
82        dist = (ACx - prevACx).^2 + (ACy - prevACy).^2 + (ACz - prevACz).^2;
```

```
83      delta_dist = sqrt(dist);
84      %% BEGINNING OF ALGORITHM PIPELINE
85      if (delta_dist >= distance_diff)
86          [ LOSx, LOSy, LOSz] = geodetic2ecef(tlat, tlng, talt, ellip);
87          % ECEF Coordinates
88          sav_AC_Latitude(frm_count) = ACx; %Aircraft
89          sav_tlat_Ecef_LOS(frm_count) = LOSx; %Line-of-Sight
90          % ECEF Coordinates
91          sav_AC_Longitude(frm_count) = ACy; %Aircraft
92          sav_tlong_Ecef_LOS(frm_count) = LOSy; %Line-of-Sight
93          % ECEF Coordinates
94          sav_AC_Altitude(frm_count) = ACz; %Aircraft
95          sav_talt_Ecef_LOS(frm_count) = LOSz; %Line-of-Sight
96
97          if (frm_count > 1)
98              A = [sav_AC_Latitude(frm_count - 1), sav_AC_Longitude(frm_count - 1), sav_AC_Altitude(frm_count - 1)];
99              B = [sav_tlat_Ecef_LOS(frm_count - 1), sav_tlong_Ecef_LOS(frm_count - 1), sav_talt_Ecef_LOS(frm_count - 1)];
100             C = [sav_AC_Latitude(frm_count), sav_AC_Longitude(frm_count), sav_AC_Altitude(frm_count)];
101             D = [sav_tlat_Ecef_LOS(frm_count), sav_tlong_Ecef_LOS(frm_count), sav_talt_Ecef_LOS(frm_count)];
102
103             [Point_of_Intersection] = findIntersection(A, B, C, D);
104             [Target_Lat, Target_Long, Target_Alt] = ecef2geodetic(Point_of_Intersection(1), Point_of_Intersection(2), ...
105                                     Point_of_Intersection(3), ellip);
106             % Used for Simulation Plot
107             savTarget_Lat_POI(tri_count) = Point_of_Intersection(1);
108             savTarget_Long_POI(tri_count)= Point_of_Intersection(2);
109             savTarget_Alt_POI(tri_count) = Point_of_Intersection(3);
110
111             % Used for Algorithm
112             savTarget_Lat(tri_count) = Target_Lat;
113             savTarget_Long(tri_count)= Target_Long;
114             savTarget_Alt(tri_count) = Target_Alt;
115
116             averageLat  = sum(savTarget_Lat) /tri_count;
117             averageLong = sum(savTarget_Long)/tri_count;
118             averageAlt  = sum(savTarget_Alt) /tri_count;
119
120             if (frm_count == 2)
121                responseLat = averageLat;
122                responseLon = averageLong;
123                responseAlt = averageAlt;
124             else
```

```
125                responseLat = (averageLat)* beta + (prevLat * alpha);
126                responseLon = (averageLong)* beta + (prevLon * alpha);
127                responseAlt = (averageAlt)* beta + (prevAlt * alpha);
128            end
129
130
131            [XL, YL, ZL] = lla2xyz(responseLat, responseLon, responseAlt,
       trueTgtLat, trueTgtLng, trueTgtAlt);
132            error_LOS(tri_count) = sqrt( XL*XL + YL*YL + ZL*ZL);
133
134            [XL, YL, ZL] = lla2xyz(averageLat, averageLong, averageAlt,
       trueTgtLat, trueTgtLng, trueTgtAlt);
135            error_AVG(tri_count) = sqrt( XL*XL + YL*YL + ZL*ZL);
136
137            [XL, YL, ZL] = lla2xyz(responseLat, responseLon, trueTgtAlt,
       trueTgtLat, trueTgtLng, trueTgtAlt);
138            error_LOS_LL(tri_count) = sqrt( XL*XL + YL*YL + ZL*ZL);
139
140            [XL, YL, ZL] = lla2xyz(averageLat, averageLong, trueTgtAlt,
       trueTgtLat, trueTgtLng, trueTgtAlt);
141            error_AVG_LL(tri_count) = sqrt( XL*XL + YL*YL + ZL*ZL);
142
143            true_frm(tri_count) = i + 1;
144
145            tri_count = tri_count + 1;
146            prevLat   = responseLat;
147            prevLon   = responseLon;
148            prevAlt   = responseAlt;
149        end
150        frm_count = frm_count + 1;
151        prevACx = ACx;
152        prevACy = ACy;
153        prevACz = ACz;
154    end
155
156    % LATITUDE
157    acLat_UT(i + 1) = AC_Latitude;
158    sav_tlat(i+1) = rad2deg(tlat);
159
160    % LONGITUDE
161    acLong_UT(i + 1) = AC_Longitude;
162    sav_tlng(i+1) = rad2deg(tlng);
163
164    % ALTITUDE
165    acAlt_UT(i + 1) = AC_Altitude;
166    sav_talt(i+1) = talt/.3048;
167
```

```
168    % ERROR
169    [XL, YL, ZL] = lla2xyz(tlat, tlng, talt, trueTgtLat, trueTgtLng, trueTgtAlt);
170    error_STD(i + 1) = sqrt( XL*XL + YL*YL + ZL*ZL);
171
172    [XL, YL, ZL] = lla2xyz(tlat, tlng, trueTgtAlt, trueTgtLat, trueTgtLng, trueTgtAlt);
173    error_STD_LL(i + 1) = sqrt( XL*XL + YL*YL + ZL*ZL);
174
175    end
176
177    if (unitTest == 1)
178       savAC_Lat  = acLat_UT; %sav_AC_Latitude;
179       savLOS_Lat = deg2rad(sav_tlat); %sav_tlat_Ecef_LOS;
180       savAC_Lon  = acLong_UT; %sav_AC_Longitude;
181       savLOS_Lon = deg2rad(sav_tlng); %sav_tlong_Ecef_LOS;
182       savAC_Alt  = acAlt_UT; %sav_AC_Altitude;
183       savLOS_Alt = sav_talt * 0.3048; %sav_talt_Ecef_LOS;
184    end
185
186    rad2deg(tlat);
187    rad2deg(tlng);
188    talt/.3048;
189
190    [savTgtLat, savTgtLong, savTgtAlt] = geodetic2ecef(trueTgtLat, trueTgtLng, trueTgtAlt, ellip); % True Target Location
191
192
193    %% plot 3d space
194    figure(1)
195    title('Simulation Visual')
196    [Est_Lat, Est_Long, Est_Alt] = geodetic2ecef(prevLat, prevLon, prevAlt, ellip);
197    hold on
198    scatter3(Est_Lat, Est_Long, Est_Alt, 4, 'co') % Final Result
199
200    scatter3(savTgtLat, savTgtLong, savTgtAlt, 2, 'r') % Actual Target Location
201    hold on
202    scatter3(sav_AC_Latitude, sav_AC_Longitude, sav_AC_Altitude, 2, 'g') % Aircraft Data
203    hold on
204    scatter3(sav_tlat_Ecef_LOS, sav_tlong_Ecef_LOS, sav_talt_Ecef_LOS, 2, 'g') % Line of Sight Data
205    hold on
206    scatter3(savTarget_Lat_POI, savTarget_Long_POI, savTarget_Alt_POI, 2, 'c') % Computed Intersections
207
208
209    for x = 1:(frm_count - 1)
```

```
210        AC_Pt = [sav_AC_Latitude(x), sav_AC_Longitude(x), sav_AC_Altitude(x)];
211        LOS_Pt = [sav_tlat_Ecef_LOS(x), sav_tlong_Ecef_LOS(x),
    sav_talt_Ecef_LOS(x)];
212        TGT_Pt = [savTgtLat, savTgtLong, savTgtAlt];
213        pts = [AC_Pt; LOS_Pt];
214        AC_Tgt_Pt = [AC_Pt; TGT_Pt];
215        hold on
216        plot3(pts(:,1), pts(:,2), pts(:,3))
217        hold on
218        plot3(AC_Tgt_Pt(:,1), AC_Tgt_Pt(:,2), AC_Tgt_Pt(:,3), 'r')
219    end
220
221    %% Continue with Mean Solution
222    latMean = mean(savTarget_Lat);
223    lonMean = mean(savTarget_Long);
224    altMean = mean(savTarget_Alt);
225    avg_Target_Lat  = rad2deg(latMean)
226    avg_Target_Long = rad2deg(lonMean)
227    avg_Target_Alt  = altMean/0.3048
228    frm_count;
229
230    [Est_Lat, Est_Long, Est_Alt] = geodetic2ecef(mean(savTarget_Lat),
    mean(savTarget_Long), ...
231                                      mean(savTarget_Alt), ellip);
232    hold on
233    scatter3(Est_Lat, Est_Long, Est_Alt, 2, 'm')
234
235    % Find Distance between mean and points to detect outliers
236    distance = sqrt((savTarget_Lat - latMean).^2 + (savTarget_Long -
    lonMean).^2 + (savTarget_Alt - altMean).^2);
237    indices = find((distance > 100));
238    savTarget_Lat(indices) = [];
239    savTarget_Long(indices) = [];
240    savTarget_Alt(indices) = [];
241
242    latMean = mean(savTarget_Lat);
243    lonMean = mean(savTarget_Long);
244    altMean = mean(savTarget_Alt);
245    new_avg_Target_Lat  = rad2deg(latMean)
246    new_avg_Target_Long = rad2deg(lonMean)
247    new_avg_Target_Alt  = altMean/0.3048
248
249    [Est_Lat, Est_Long, Est_Alt] = geodetic2ecef(mean(savTarget_Lat),
    mean(savTarget_Long), ...
250                                      mean(savTarget_Alt), ellip);
251    hold on
252    scatter3(Est_Lat, Est_Long, Est_Alt, 8, 'bx')
```

```
253
254    resLat  = rad2deg(prevLat)
255    resLong = rad2deg(prevLon)
256    resAlt  = prevAlt/.3048
257
258  %% Total ERROR
259    figure(8)
260    plot(true_frm, error_LOS);
261    title('New Triangulation Error - Weighted Average')
262    xlabel('Frame Count')
263    ylabel('Meters (m)')
264    grid on
265
266  %% LAT LONG ONLY ERROR
267
268    figure(12)
269    plot(true_frm, error_LOS_LL);
270    title('Lat Long Only Error - Weighted Average')
271    xlabel('Frame Count')
272    ylabel('Meters (m)')
273    grid on
274
275  %% Write Test Values to Text Document for Unit Testing
276    if (unitTest == 1)
277        A = [sav_AC_Latitude; sav_AC_Longitude; sav_AC_Altitude];
278        fileID = fopen('Unit Test\triangulationUT_AC.txt','w');
279        fprintf(fileID,'%10s %16s %16s\n','LAT','LONG','ALT');
280        fprintf(fileID,'%12.8f %12.8f %12.8f\n',A);
281        fclose(fileID);
282
283        B = [sav_tlat_Ecef_LOS; sav_tlong_Ecef_LOS; sav_talt_Ecef_LOS];
284        fileID = fopen('Unit Test\triangulationUT_LOS.txt','w');
285        fprintf(fileID,'%10s %16s %16s\n','LAT','LONG','ALT');
286        fprintf(fileID,'%12.8f %12.8f %12.8f\n',B);
287        fclose(fileID);
288    end
289 end
``` findIntersection.m

```
1  %% findIntersection – finds the aproximate intersection point
2
3
4
5
```

```
 6
 7
 8
 9
10
11  function [Point_of_Intersection] = findIntersection(A, B, C, D)
12      % The 4 vectors must all be the same size
13      [rows, cols] = size(A);
14
15      A_matrix = zeros(cols,2);
16      A_matrix(:,1)= (B - A)';
17      A_matrix(:,2)= (C - D)';
18
19      B_matrix = zeros(cols,1);
20      B_matrix(:,1) = (C - A)';
21
22      % Compute QR Factorization
23      % QR Factorization Resources:
24      % http://www.seas.ucla.edu/~vandenbe/103/lectures/qr.pdf
25      % http://www.math.ucla.edu/~yanovsky/Teaching/Math151B/handouts/GramSchmidt.pdf
26
27      Q = zeros(cols,2);
28      R = zeros(2,2);
29      % u_1 = a_1
30      u_1 = A_matrix(:,1);
31      e_1 = u_1 / sqrt(sum((u_1.^2)));
32
33      % u_2 = a_2 - (dot_product(a_2, e_1))*e_1
34      u_2 = A_matrix(:,2) - (dot(A_matrix(:,2)',e_1)) * e_1;
35      e_2 = u_2 / sqrt(sum((u_2.^2)));
36
37      Q(:,1) = e_1';
38      Q(:,2) = e_2';
39
40      r11 = dot(A_matrix(:,1)', e_1);
41      r12 = dot(A_matrix(:,2)', e_1);
42      r22 = dot(A_matrix(:,2)', e_2);
43      R(1,1) = r11;
44      R(1,2) = r12;
45      R(2,2) = r22;
46
47
48      qTb = Q' * B_matrix;
49      %x = R\qTb;
50      size(qTb)
```

```
51    x_2 = qTb(2)/R(2,2);
52    %y = A_matrix\B_matrix;
53
54
55    %Point_of_Intersection = A' + x(1)*(B - A)';
56    %Point_of_Intersection = C' - x_2*(D - C)';
57    Point_of_Intersection = C' - x_2*(A_matrix(:,2));
58  end
``` lla2ecf.m

```
1   %%% NOTE: ORIGIN IS FIRST HERE
2   function [x, y, z, M] = lla2ecf(lat, lng, alt)
3
4
5     lat = deg2rad(lat);
6     lng = deg2rad(lng);
7
8     ellip = [6378137.0, sqrt(.00669437999013)];
9
10    [x, y, z] = geodetic2ecef(lat, lng, alt, ellip);
11
12    Cos_Lat  = cos(lat);
13    Sin_Lat  = sin(lat);
14    Cos_Long = cos(lng);
15    Sin_Long = sin(lng);
16
17
18    %% calculate the ECF to NED rotation matrix
19    M(1,1) = -Sin_Lat * Cos_Long;
20    M(1,2) = -Sin_Lat * Sin_Long;
21    M(1,3) = Cos_Lat;
22    M(2,1) = -Sin_Long;
23    M(2,2) = Cos_Long;
24    M(2,3) = 0.0;
25    M(3,1) = -Cos_Lat * Cos_Long;
26    M(3,2) = -Cos_Lat * Sin_Long;
27    M(3,3) = -Sin_Lat;
28
29  end
``` lla2rae.m

```
1   %%% NOTE: ORIGIN IS FIRST HERE
2   function [rae] = lla2rae(lat0, lng0, alt0, lat, lng, alt)
3
4
5       ellip = [6378137.0, sqrt(.00669437999013)];
6
7       [X, Y, Z] = geodetic2ecef(lat, lng, alt, ellip);
8
9       [XL, YL, ZL] = ecef2lv(X, Y, Z, lat0, lng0, alt0, ellip);
10
11      rae(1) = sqrt(XL*XL + YL*YL + ZL*ZL);
12      rae(2) = atan2(XL,YL);
13      rae(3) = atan(ZL/sqrt(XL*XL + YL*YL));
14
15      rae(2) = rad2deg(rae(2));
16      rae(3) = rad2deg(rae(3));
17
18  end
``` lla2xyz.m

```
1   function [XL, YL, ZL] = lla2xyz(lat, lng, alt, lat0, lng0, alt0)
2
3
4       ellip = [6378137.0, sqrt(.00669437999013)];
5
6       [X, Y, Z] = geodetic2ecef(lat, lng, alt, ellip);
7
8       [XL, YL, ZL] = ecef2lv(X, Y, Z, lat0, lng0, alt0, ellip);
9
10
11  end
``` ned2lla.m

```
1   function [lat, lng, alt] = ned2lla(N, E, D,
```

```
    lat0, lng0, alt0)
2
3    ellip = [6378137.0, sqrt(.00669437999013)];
4
5    XL =  E;
6    YL =  N;
7    ZL = -D;
8
9    [X, Y, Z] = lv2ecef(XL, YL, ZL, lat0, lng0, alt0, ellip);
10
11   [lat, lng, alt] = ecef2geodetic(X, Y, Z, ellip);
12
13 end
```

What is claimed is:

1. A method for determining a position of a target, the method comprising:
   determining a first direction to the target from a first observing position of a platform;
   estimating a first approximate position of the target in three dimensions based on the first direction and the first observing position;
   determining a second direction to the target from a second observing position;
   estimating a second approximate position of the target in three dimensions based on the second direction and the second observing position of the platform; and
   determining a first approximate intersection point of:
      a first finite length line between the first observing position and the first approximate position of the target, and
      a second finite length line between the second observing position and the second approximate position of the target.

2. The method of claim 1, further comprising:
   determining a third direction to the target from a third observing position,
   estimating a third approximate position of the target based on the third direction and the third observing position, and
   determining a second approximate intersection point between:
      the second finite length line, and
      a third finite length line between the third observing position and the third approximate position of the target.

3. The method of claim 2, further comprising forming a straight average of a plurality of approximate intersection points including the first approximate intersection point and the second approximate intersection point.

4. The method of claim 3, further comprising forming a weighted average of:
   the straight average; and
   the second approximate intersection point.

5. The method of claim 1, wherein the determining of the first approximate intersection point of the first finite length line and the second finite length line comprises:
   when the first finite length line and the second finite length line have a point of intersection, finding the point of intersection of the first finite length line and the second finite length line, and
   when the first finite length line and the second finite length line do not intersect, finding a point separated from
      a midpoint of a shortest line connecting the first finite length line and the second finite length line
      by less than
      twice the length of the shortest line connecting the first finite length line and the second finite length line.

6. The method of claim 1, wherein the determining of the first approximate intersection point of the first finite length line and the second finite length line comprises:
   representing the first finite length line as:
      a three-element point A, and
      a three-element point B,
      each being a respective endpoint of the first finite length line,
   representing the second finite length line as:
      a three-element point C, and
      a three-element point D,
      each being a respective endpoint of the second finite length line,
   defining a first infinite length line collinear with the first finite length line and parameterized by a parameter t, the parameter t being proportional to a distance along the first infinite length line from the point A,
   defining a second infinite length line collinear with the second finite length line and parameterized by a parameter s, the parameter s being a proportional to distance along the second infinite length line from the point C,
   solving an overdetermined linear system for values of s and t, the overdetermined linear system resulting from equating:
      coordinates, parameterized by the parameter t, of points in the first infinite line,
   to
      coordinates, parameterized by the parameter s, of points in the second infinite line, and
   substituting the value of one of the parameters s and t into the equation for the respective corresponding infinite length line.

7. The method of claim 6, wherein the solving of the overdetermined linear system comprises solving the overdetermined linear system using a QR factorization.

8. The method of claim 1, wherein the estimating of the first approximate position of the target comprises:
   estimating the first approximate position of the target as an intersection of:
      an infinite length line from the first observing position, in the first direction, with
      a terrain model surface.

9. The method of claim 8, wherein the terrain model surface is defined as a local terrain elevation offset from an Earth ellipsoid.

10. The method of claim 9, wherein the local terrain elevation offset is represented as a grid of elevation points, each elevation point being an estimated elevation, above the Earth ellipsoid, at a respective grid point, each grid point being defined by a latitude and a longitude.

11. A system for determining a position of a target, the system comprising a sensor connected to a processing circuit, the processing circuit being configured to:
   determine a first direction to the target from a first observing position of a platform;
   estimate a first approximate position of the target in three dimensions based on the first direction and the first observing position;
   determine a second direction to the target from a second observing position of the platform;
   estimate a second approximate position of the target in three dimensions based on the second direction and the second observing position; and
   determine a first approximate intersection point of:
      a first finite length line between the first observing position and the first approximate position of the target, and
      a second finite length line between the second observing position and the second approximate position of the target.

12. The system of claim 11, wherein the processing circuit is further configured to:
   determine a third direction to the target from a third observing position,
   estimate a third approximate position of the target based on the third direction and the third observing position, and
   determine a second approximate intersection point between:
      the second finite length line, and
      a third finite length line between the third observing position and the third approximate position of the target.

13. The system of claim 12, wherein the processing circuit is further configured to form a straight average of a plurality of approximate intersection points including the first approximate intersection point and the second approximate intersection point.

14. The system of claim 13, wherein the processing circuit is further configured to form a weighted average of:
   the straight average; and
   the second approximate intersection point.

15. The system of claim 11, wherein the determining of the first approximate intersection point of the first finite length line and the second finite length line comprises:
   when the first finite length line and the second finite length line have a point of intersection, finding the point of intersection of the first finite length line and the second finite length line, and
   when the first finite length line and the second finite length line do not intersect, finding a point separated from
      a midpoint of a shortest line connecting the first finite length line and the second finite length line
      by less than
      twice the length of the shortest line connecting the first finite length line and the second finite length line.

16. The system of claim 11, wherein the determining of the first approximate intersection point of the first finite length line and the second finite length line comprises:
   representing the first finite length line as:
      a three-element point A, and
      a three-element point B,
      each being a respective endpoint of the first finite length line,
   representing the second finite length line as:
      a three-element point C, and
      a three-element point D,
      each being a respective endpoint of the second finite length line,
   defining a first infinite length line collinear with the first finite length line and parameterized by a parameter t, the parameter t being proportional to a distance along the first infinite length line from the point A,
   defining a second infinite length line collinear with the second finite length line and parameterized by a parameter s, the parameter s being a proportional to distance along the second infinite length line from the point C,
   solving an overdetermined linear system for values of s and t, the overdetermined linear system resulting from equating:
      coordinates, parameterized by the parameter t, of points in the first infinite line,
   to
      coordinates, parameterized by the parameter s, of points in the second infinite line, and
   substituting the value of one of the parameters s and t into the equation for the respective corresponding infinite length line.

17. The system of claim 16, wherein the solving of the overdetermined linear system comprises solving the overdetermined linear system using a QR factorization.

18. The system of claim 11, wherein the estimating of the first approximate position of the target comprises:
   estimating the first approximate position of the target as an intersection of:
      an infinite length line from the first observing position, in the first direction, with
      a terrain model surface.

19. The system of claim 18, wherein the terrain model surface is defined as a local terrain elevation offset from an Earth ellipsoid.

20. The system of claim 19, wherein the local terrain elevation offset is represented as a grid of elevation points, each elevation point being an estimated elevation, above the Earth ellipsoid, at a respective grid point, each grid point being defined by a latitude and a longitude.

* * * * *